(12) United States Patent
Joshi et al.

(10) Patent No.: US 8,631,504 B2
(45) Date of Patent: Jan. 14, 2014

(54) DOCUMENT SECURITY WITHIN A BUSINESS ENTERPRISE

(75) Inventors: Jayant Joshi, Drummoyne (AU); Janaki Jayant Joshi, Drummoyne (AU)

(73) Assignee: Jayant Joshi, North Ryde, New South Wales (AU)

(*) Notice: Subject to any disclaimer, the term of this patent is extended or adjusted under 35 U.S.C. 154(b) by 948 days.

(21) Appl. No.: 12/141,032

(22) Filed: Jun. 17, 2008

(65) Prior Publication Data

US 2008/0294478 A1 Nov. 27, 2008

Related U.S. Application Data

(63) Continuation of application No. 10/893,238, filed on Jul. 19, 2004, now abandoned.

(51) Int. Cl.
*H04L 29/02* (2006.01)
*G06F 21/00* (2013.01)

(52) U.S. Cl.
USPC .................. 726/28; 726/3; 726/4; 726/27

(58) Field of Classification Search
USPC ......................... 726/26–30; 705/51
See application file for complete search history.

(56) References Cited

U.S. PATENT DOCUMENTS

| | | | |
|---|---|---|---|
| 6,460,141 B1* | 10/2002 | Olden | 726/4 |
| 7,035,825 B1* | 4/2006 | Sturtevant et al. | 705/51 |
| 7,120,698 B2* | 10/2006 | Krishnapuram et al. | 709/229 |
| 7,185,192 B1* | 2/2007 | Kahn | 713/155 |
| 7,788,489 B2* | 8/2010 | Ng | 713/167 |
| 7,865,959 B1* | 1/2011 | Lewis | 726/26 |
| 7,882,544 B2* | 2/2011 | Buehler et al. | 726/4 |
| 2002/0062240 A1* | 5/2002 | Morinville | 705/8 |
| 2003/0200459 A1* | 10/2003 | Seeman | 713/200 |
| 2004/0181442 A1* | 9/2004 | Hensel et al. | 705/7 |
| 2005/0060572 A1* | 3/2005 | Kung et al. | 713/201 |
| 2005/0138420 A1* | 6/2005 | Sampathkumar et al. | 713/201 |

* cited by examiner

*Primary Examiner* — Minh Dinh
(74) *Attorney, Agent, or Firm* — Michael Molins

(57) ABSTRACT

A computer-based method for defining an enterprise organization providing electronic document security. Enterprise elements of management groups are defined to correspond with an area of accountability, each group having one of several types, including "line of business", "key results area", and "senior management". Each group has several subgroups, including "group head", "administrative assistant" and "direct report". Employees are assigned to one or more management group and subgroup, and management groups are related to each other to represent the organization hierarchy. Groups may be related as "reports to", "services", or other defined relationships. Documents are defined having document content and properties. The properties include owning and related management groups. Access to the document is declared so that employees have a level of access based on membership of one or more groups.

20 Claims, 5 Drawing Sheets

| Group 1 | Group Name | Group Type | Other Attributes |
| Group 2 | Group Name | Group Type | Other Attributes |
| Group 3 | Group Name | Group Type | Other Attributes |
| Group 4 | Group Name | Group Type | Other Attributes |
| ⋮ | | | |
| Group N | Group Name | Group Type | Other Attributes |

| Group | Document Status | Read-only | | | Read-write | | |
|---|---|---|---|---|---|---|---|
| | | Group Head | Admin. Ass'ts | Direct Report | Group Head | Admin. Ass'ts | Direct Report |
| Owner | Draft | Yes | Yes | Yes | Yes | Yes | Yes |
| Owning Group | Draft | Yes | | Yes | Yes | | Yes |
| Related Key Results Group | Draft | | | | | | |
| Related Stake-holder Group | Draft | | | | | | |
| Owner | Final | Yes | Yes | Yes | | | |
| Owning Group | Final | Yes | Yes | Yes | | | |
| Related Key Results Group | Final | Yes | | | | | |
| Related Stake-holder Group | Final | Yes | | | | | |

Figure 5

DOCUMENT SECURITY WITHIN A BUSINESS ENTERPRISE

BACKGROUND OF THE INVENTION

1. Field of the Invention

The invention relates generally to computer systems, which represent an organisational business enterprise, and specifically to a representation of an organisation in a database and the use of the representation for the protection of computer information.

2. Description of Related Art

As is well known, business enterprises are organised into groups and structures, which maximise the overall efficiency of the business. An enterprise may be divided into locations, departments, geographical regions, divisions, or others. The number and types of these are varied and change over time. Current art provides many means for representing an organisation in a computer system. These computer representations are often linked to the enterprise's e-mail and document storage systems to provide a wide range of services. Of these services, of particular importance is the protection of the enterprise's documents from unauthorised access. Many systems have been devised for protecting documents. These systems range from simple implementations, for example a list of authorised employees, to complicated systems using passwords, biometrics (e.g. voice recognition), and others. As an organisation changes, the computer representation of the organisation must be made up to date. As employees change jobs or when the organization is restructured, for example, access to new documents may need to be granted and existing access to documents may need to be changed or removed.

Additional complexity exists as a document changes over time. When a document is created, it may then goes through a variety of processing states including review, revision, approval, and distribution. A document may have a status of "draft" or "final". It may require approval and thus may be "approved" or "unapproved". It may be "finalised" or "published". Access to a document may change throughout this processing, for example, a policy document may have limited access until approved when it becomes public. Individuals in an organisation may have differing processing preferences and requirements. Some with approval authority may delegate that authority to another as a matter of choice, for example, a senior member of a department may review documents on behalf of the department's manager as a matter of the manager's choice.

Documents may be distributed through the enterprise. In some cases, electronic distribution is used, for example, using e-mail. Documents may be distributed and either absolutely or relatively addressed. Absolute address is independent of the sender of the document; while relative address is relative to the sender of the document. For example, sending a document to "the head of the legal department" is independent of who is sending it, where sending a document to "my manager" is dependent of the sender.

Finally, an individual within an organisation has at least three different roles, which roughly speaking correspond to "the person", "the office of", and "the desk of". When sending a document to a person, it may be intended only for the person, for example, a finalised and approved request for leave is returned to the originator. A document may be intended for the "office of" where the document is to be reviewed by the office-designated reviewer. A document may be intended for the "desk of" where the document is to be approved by the individual or designated other, for example, while on leave. In addition, access to a document, as distinguished from distribution of document, may be limited to the individual, the "office of" or the "desk of" a person within the organisation.

Current art systems have used a variety of strategies and techniques to manage the complexity of business organisations. These strategies range from simple lists of department members to complex database systems. Each of these systems provides a employee interface for entering and maintaining the enterprise organisation in computer form, and offers one or more output reports, e.g. phone directories, organisation charts, etc., to display the current organisation. Each of these systems is lacking the ability to maintain security requirements up-to-date as the organization undergoes periodic restructures. These systems represent the organization in terms of its actual organization chart shown as individual organizational positions reporting to others further up the hierarchy and so on. With each re-organization, this requires changing the representation so that security requirements reflect the revisions. This invention enables representing the organization in terms of underlying 'areas of accountabilities' rather than the individual reporting relationships. As the organization is restructured, the areas of accountability do not necessarily need to be changed. They can simply be re-assigned to the new organization structure.

SUMMARY AND OBJECT OF THE PRESENT INVENTION

The present invention represents an organisation as a network of "management groups". These groups represent divisions of an organisation based on the accountability the group has within the organisation. These management groups are entered into a database and populated with members being assigned to the group. The management groups are related to each other to represent the organisation's hierarchy.

Once entered, the management groups form the basis for:
a) The representation of the enterprise as 'areas of accountability' for which specific personnel and organisation units are accountable.
b) The basis for the protection of and access to documents, and
c) The basis for the distribution of information using electronic methods using alternative addressing of "to the office of", "to the desk of" and others.

It is therefore the object of the present invention to provide a database representation of an enterprise based on management groups. It is another object to provide for using this representation as a basis for the protection of documents and other information within the enterprise. It is yet another object of the present invention to provide for using the representation as the basis for an electronic distribution system which allows alternative addressing methods for information.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 5 illustrates one possible protection matrix.

DESCRIPTION OF THE PREFERRED EMBODIMENTS

Figures 1, 2:
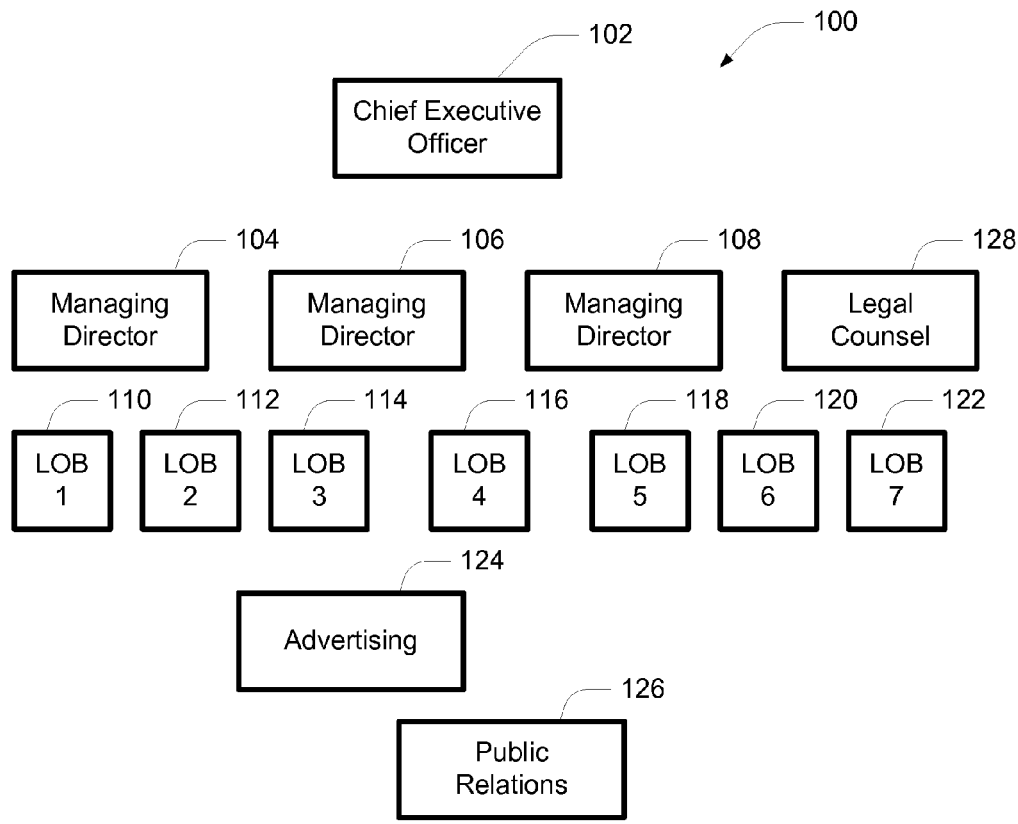
FIG. 1 is a block diagram illustrating and one example of a organisational hierarchy.
FIG. 2 is a table illustrating one set of attributes of the groups of an organisational hierarchy.

In the following description numerous specific details are set forth in order to provide a more thorough understanding of the present invention. It will be apparent to one skilled in the art that the present invention may be practiced without these specific details. In other instances, well-known features have not been described in order to not obscure the invention.

An organisation can be considered to be a network of accountabilities, for example, accountable for research and development, or sales. In the present invention, management groups are formed to emulate the organisation of accountabilities within it, such that logical groupings can be formed between employees and information. For management groups to function, employees must be associated with them because, ultimately, people are accountable. By associating employees with areas of accountability, logical groupings of people who share common security requirements are formed.

The present invention implements one or more "management groups" within the enterprise and stores related information in a database. A management group comprises one or more types of members:

a) Group head—typically the person holding the chair of the management group, and other personnel for example executive assistants who have the same access to documents.

b) Administrative Assistants—personal assistants who have different access to documents from the group head, and c) Direct reports—personnel reporting to the group head, forming an organisational group within the enterprise, for example, a department.

Other types of members are possible, including "project leader", "project sponsor", "project manager", and "project team member"

Management groups are classified into one of several types to represent the different types of accountabilities within an enterprise. These types include:

1) Line of business (also called 'Product Group', 'Brand Group', 'Category Group', 'Service Group', or other grouping of items that can be purchased from the organisation)—areas of accountability focused on a particular line of business, for example, in furniture business, chairs, desks, and sofas may be different lines of business;

2) Key Results Area (also called 'Functional Area', 'Service Group' etc)—areas of accountability related to and providing service to other management groups, though not having line of business accountabilities, for example, public relations;

3) Senior Management—areas of accountability having line of business or key results area groups reporting to it, for example, a general manager having lines of business and public relations groups reporting to it;

4) Competitor Brand—areas of accountability for tracking competitors with which respective competitors' lines of business can be associated;

5) Related Stakeholder—areas of accountability that do not fit other types of management groups. These may include service accountabilities outside the current enterprise, for example, an external public relations agency.

The use of the present invention comprises the following steps:

1. Defining management groups and mapping them to enterprise organisational divisions, 2. Assigning each employee to one or more management group and designating one management group as "primary", 3. Linking the management groups by assigning one or more relationship between groups, 4. Defining documents and other information having properties used to restrict or grant access by management group. For the purpose of this disclosure, the term "document" generally refers to a unit of information stored in a computer system. A document includes but is not limited to information forms of text, figures, pictures, data either formatted or unformatted, charts, graphs, presentations, audio and visual data files, or computer-readable programs.

First, the management groups are mapped to enterprise organisational divisions, for example, departments, and will typically although not necessarily resemble the enterprise organisational hierarchy. The hierarchy of management groups, however, does not necessarily have to be an exact replica of an organisation's departmental hierarchy, as management groups are a logical abstraction of accountability grouping not limited to the existing departmental hierarchy.

Next, each employee is assigned to one or more management groups as a group head, administrative assistant, or a direct report. While each employee may be assigned to more than one management group, one assignment is "primary". Each management group will thus have zero or more members (empty management groups represent accountabilities that are unassigned to employees. They may report to a higher management group that is collectively accountable for a set of 'empty' management groups).

Third, the management groups are linked using one of several relationship types. The first type is "reports to". This type of link is designated by selecting the management group further up the hierarchy to which the current management group reports. It is usual although not necessary to place the group head of one management group in the "direct reports" subgroup of another management group. This reflects the typical reporting structure of the enterprise. A "reports to" relationship can also be established without any personnel relationship. In fact, a management group may be empty (for example for a future but as yet unassigned accountability) while in a "reports to" relationship to another management group. In this case the group head of the parent management group holds the accountability for the empty child management group. The second type of relationship is a "services" relationship, which links a key results area management group with a line of business management group. For example, an advertising key results area management group may have "services" relationships with each of the furniture line of business management groups. The third type of link is a "related stakeholder" relationship, allowing management groups to be linked other than by "reports to" or "services" providing additional flexibility to create 'dotted line' relationships as an example.

When the steps of defining management groups, adding employees to the management groups, and linking the management groups by assigning a relationship between the groups have been accomplished, the next step is to define one or more documents having properties used to grant or deny access. These properties include:

1. Document identification, for example, document name, subject, dates of creation, author, status of draft or final, etc.

2. Document location, where the document is stored, including access path information.

3. Management groups accountable for the document

4. Owning employee

5. Security matrix, access rights by group type and subtype to the document.

Over time, the enterprise organisation changes. These changes are reflected in the database by adding or removing employees and management groups; defining, removing, or changing relationships between management groups; changing access rights to documents; or other similar changes.

Figure 3:
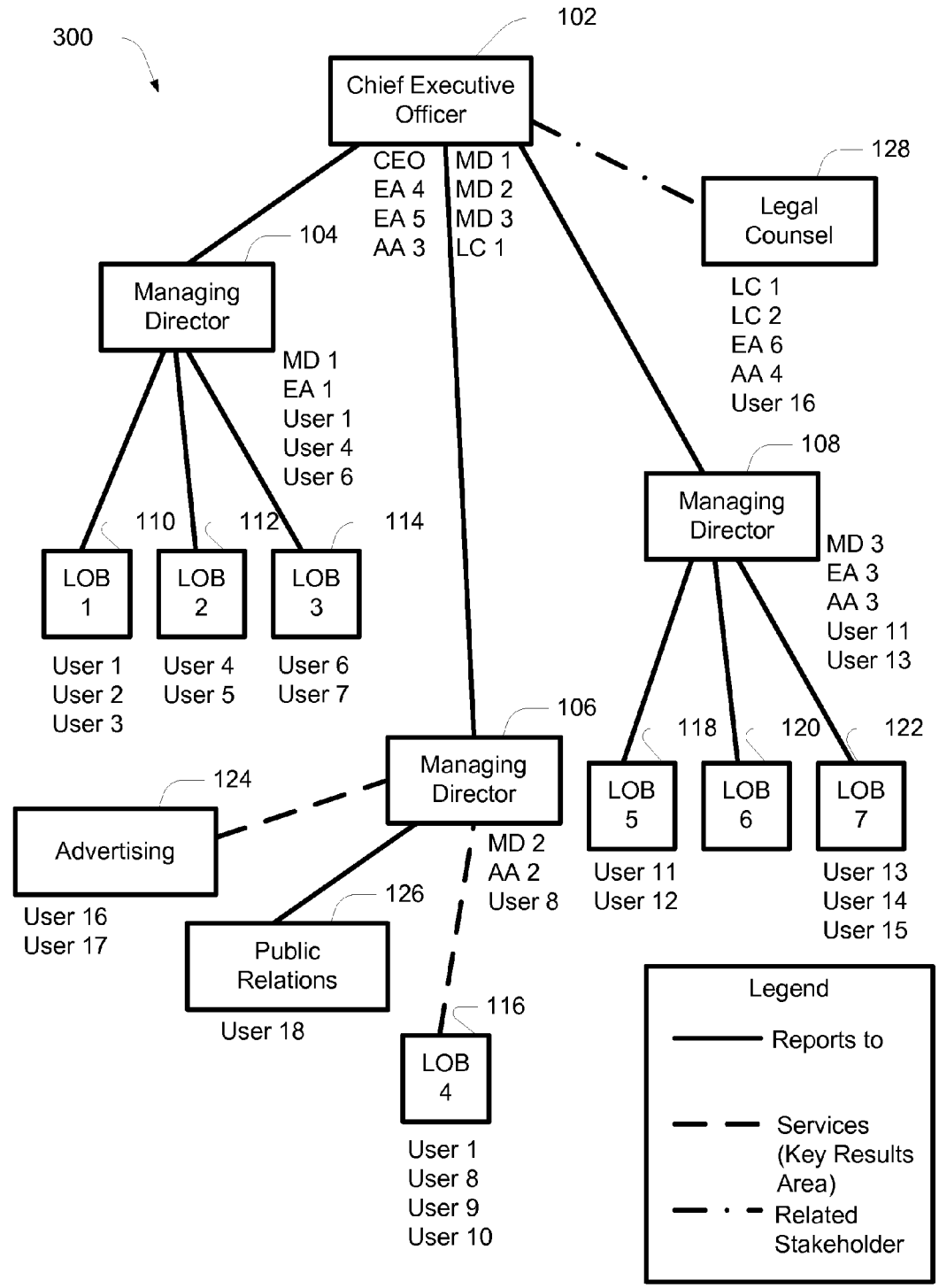
FIG. 3 is the organisational hierarchy of FIG. 1 with one set of possible relationships between groups and employees.

Referring now to FIG. 1, illustrating one possible organisational hierarchy 100, having a Chief Executive Office 102; three Managing Directors, 104-108; seven lines of businesses 110-122; two key results areas, advertising 124, and public relations 126; and one related stakeholder group, legal counsel 128. Each of these entities is represented in the present invention as a management group. The CEO and Managing Directors 100-108, are of the senior management type. The other groups are of the line of business, key results area, and related stakeholder type respectively. FIG. 2 illustrates a computer database 200 having one record for each group containing group name and other attributes and properties that define the group, including group type. FIG. 3 illustrates the hierarchy 300 with groups 102-128 populated with employees and related to each other with links. The employees CEO, MD 1, MD 2, MD 3, user 1, user 4' user 6, user 11, and user 13 are in the group head subgroup of the respective group. EA 1, EA 2, EA 3, EA 4, and EA 5 are executive assistants to the group head in the respective group and are in the respective group head subgroup. AA 2 and AA 3 are administrative assistants and are in the "administrative assistant" subgroup in the respective groups. LC 1 and LC 2 are both in the group head subgroup of the "Legal Counsel" group. User 1 through user 18 are in the direct report subgroup of the respective group. Illustrated in this hierarchy are an empty group (LOB 6) 120 having no members, a employee who is group head of two groups (user 1 is group head of LOB 1 110 and LOB 4 116), and a group with two group heads (Legal Counsel 128 has LC 1 and LC 2 as group heads, representing partners in the legal consulting accountability.) Other combinations and relationships are permitted to give flexibility in mapping groups and employees to represent a wide range of organisational hierarchies.

The Managing Director groups 104-108 are related to the CEO group 102 with a "reports to" link. The lines of business groups 110-122 are related to the Managing Director groups 104-108 also with "reports to" links. The two key results area groups 124 and 126 are related to Managing Director group 104 with a "key results area" link showing that the Managing Director 106 is accountable for these key results areas. Finally, the legal counsel group 128 is related to the CEO group 102 as a "related stakeholder" showing that the CEO is accountable for the legal group.

Figure 4:
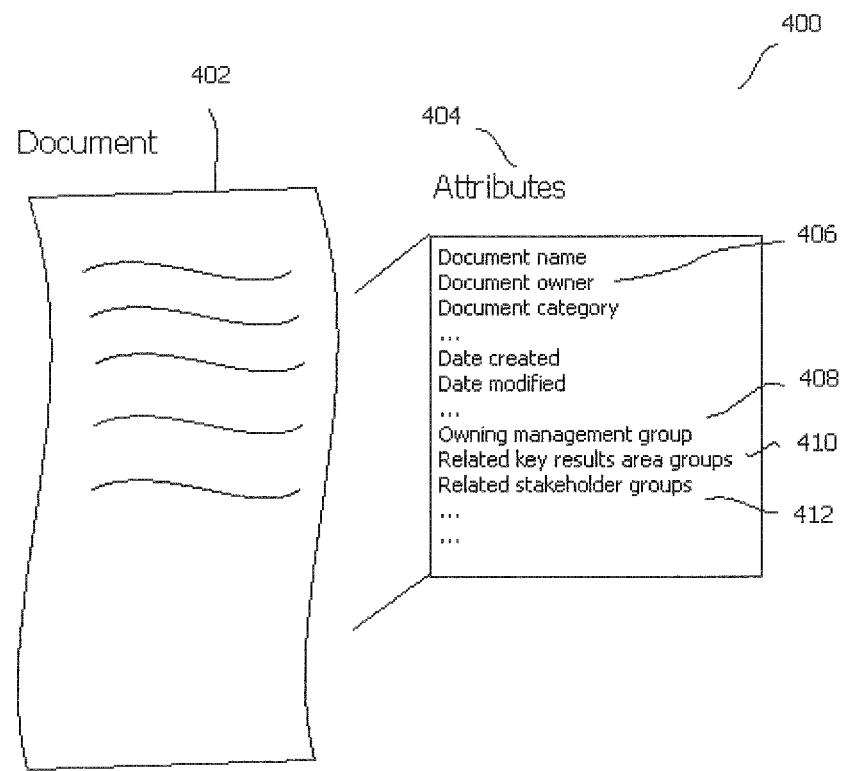
FIG. 4 illustrates a possible set of attributes for a document.

FIG. 4 illustrates a document 402 having attributes, including owner 406, owning management group 408, and related key results area 408 and related stakeholder groups 410. FIG. 5 illustrates an access matrix allowing or denying read-only or read-write access to the document of FIG. 4. Each cell of the table has the value "yes" or "no" indicating access is permitted or not. The columns represent levels of access. Shown are two levels, read-only and read-write; other levels of access are possible, for example, distribute, print, create, and destroy. The rows represent a combination of group, subgroup, and document status. For example, members of a group and subgroup may have read-write access to a draft document, but read-only access to final document. Shown are status values of draft and final; other status values are possible, for example, pending, published, approved, under review, etc. In the figure, the owner, and the group head and direct reports of the owning management group have read-write access to the draft document. When the document status is final, the owner, all members of the owning group, and the group heads of the key results area and related stakeholder groups have read access. All other employees have no access to the document.

Figure 6:
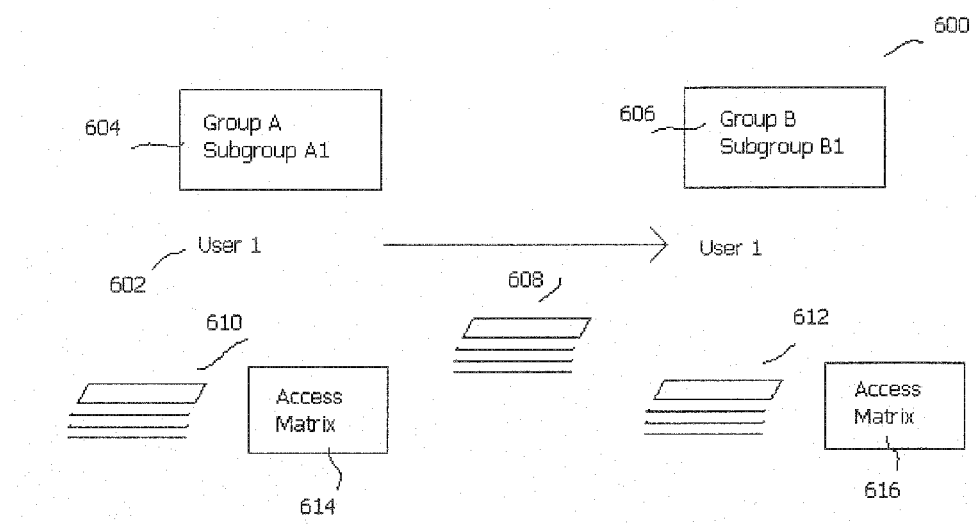
FIG. 6 illustrates the process of document protection of the present invention when an employee moves from one group to another.

FIG. 6 illustrates a employee 1 602 moving from one management group 604 to another management group 606. As an owner of documents 608, the employee retains the level of access to these documents. As a member of the new group 606, the employee immediately gains access to documents granted access to the new group 612 for any document granted access by an associated access matrix 616. Because the employee has left group 604, access to documents 610 granted based on membership in group 604, as defined by the associated access matrix, is removed. Unless access is granted because of membership in the new group 606, access to the documents 614 is lost.

This patent thus provides technical advantages over current art. It will be understood that the above description are merely illustrative of the application of the principles of the present invention and many other embodiments and modifications may be made without departing from the spirit and scope of the invention as defined in the claims.

We claim:

1. A method for defining an enterprise organisation and protecting a document, the method implemented by an interactive computer system, the document being stored in a computer-controlled repository, the method comprising the steps of:
   (a) defining two or more management groups, wherein each of the management groups are assigned at least one group type;
   (b) assigning a relationship link between pairs of the management groups, whereby assigning the relationships linking the management groups defines a hierarchy of the enterprise organisation;
   (c) assigning a relationship link type to each relationship link, wherein the relationship link type is selected from a predefined set including at least two relationship link types;
   (d) storing data indicative of the management groups and corresponding relationship link between pairs of the management groups in a computer-controlled database;
   (e) defining document properties associated with the document, the document properties being indicative of a first management group having ownership of the document; the document properties being further indicative of an access restriction to the document for another management group on the basis of the hierarchy of the enterprise organisation being dependant on a relationship link type associating such management group to the first management group, wherein the document properties comprise a respective access restriction associated with each of the at least two relationship link types included in the predefined set;
   (f) reviewing the document properties and associating access rights including a level of access to the document, the access rights further granting access to a second management group in accordance with the hierarchy of the enterprise organisation and relationship link type associating the second management group through to the first management group;
   (g) granting an employee belonging to the second management group access to the document, when at least the second management group satisfies the access rights associated with the document.

2. The method of claim 1, further comprising the step of altering representation of the hierarchy of the enterprise organisation by:

adding or removing management groups; or adding, removing, or changing relationship between management groups;

wherein access rights associated with the document are updated in accordance with the hierarchy of the enterprise organisation; and wherein data indicative of the access rights is stored in a computer-controlled repository and associated with the respective document.

3. The method of claim 1, further comprising the step of altering the access to a document by: amending the document properties to add or remove management groups having access rights; or changing the level of access granted to a management group;

wherein data indicative of the access rights is stored in a computer-controlled repository and associated with the respective document.

4. The method of claim 1, wherein:

the group type is selected from the set of "line of business", "senior management", "key results area", "competitor brand", and "related stakeholder".

5. The method of claim 1, further comprising the step of:

defining one or more sub-group within the management groups;

wherein subgroup type is selected from the set of "group head", "administrative assistant", "direct report", "project leader", "project sponsor", "project manager", and "project team member".

6. The method of claim 1, wherein:

the relationship link type assigned to each relationship link between a pair of management groups is selected from the predefined set including at least two relationship link types selected from any two or more of: "reports to", "services", and "other relationship".

7. The method of claim 1, wherein:

access level is selected from the set of "no access", "read access", "read/write access", "read/write with create/destroy access", "distribute", and "print".

8. The apparatus of claim 1 wherein:

the document properties being indicative of document status; and an access restriction to the document being further determined on the basis of document status.

9. An interactive computer apparatus for defining an enterprise organisation and protecting a document, the document being stored in a computer-controlled repository, the apparatus comprising:

an interactive interface for defining management groups, relationship links between pairs of management groups and assigning a relationship link type to each relationship link, wherein the relationship link type is selected from a predefined set including at least two relationship link types, thereby to define a hierarchy of the enterprise organisation;

a database for containing data indicative of definitions of the management groups, relationship links between pairs of management groups, and respective relationship link type;

an interactive interface for defining documents having document properties, document properties being associated with each of the one or more documents, the document properties being indicative of a first management group having ownership of the document, the document properties being further indicative of an access restriction to the respective document for another management group on the basis of the hierarchy of the enterprise organisation being dependant on a relationship link type associating such management group to the first management group, wherein the document properties comprise a respective access restriction associated with each of the at least two relationship link types included in the predefined set;

wherein access rights further grant an employee belonging to the second management group access to a second management groups according to hierarchy of the enterprise organisation and relationship link type associating the second management group through to the first management group;

the repository storing the document and the corresponding document properties;

an interactive interface for an employee accessing documents in the repository;

wherein the employee is granted access to the document, when at least the second management group satisfies the access rights associated with the document.

10. The apparatus of claim 9 wherein:

the management groups are of a type selected from the set "senior management", "line of business", "key results area", "competitor brand", and "other stakeholder"; and each management group comprises one or more management subgroup of a type each selected from the set "group head", "administrative assistant", "direct report", "project leader", "project team member", "project manager", and "project sponsor".

11. The apparatus of claim 9 wherein:

the relationship type assigned to each relationship link between a first management group and a second management group is selected from the predefined set including at least two relationship link types selected from any two or more of:

"reports to", "services", and "other relationship"; and the relationship between a employee and a management group belongs to the set "member of".

12. The apparatus of claim 9 wherein:

employees are related to a management group by assigning a membership attribute to one of the management groups.

13. The apparatus of claim 9 wherein:

document properties define an owning management group and zero or more accessing groups;

the accessing groups having access rights selected from the set "read-only", "read-write", "create", "destroy", "print", and "distribute";

such that members of the accessing group have the defined access rights.

14. A non-transitory computer readable medium having stored thereon a data structure for protecting a document, the document being stored in a computer-controlled repository, the data structure comprising:

data records defining each of, two or more management groups, one or more relationship link each associated between a pair of the management groups, and the document;

wherein each management group record having a management group type and a management subtype;

wherein each relationship record associates a first management group to a second management group for defining a hierarchy of an enterprise organisation, each relationship record includes a relationship link type selected from a predefined set including at least two relationship link types;

wherein each document record has respective document properties, the document properties being indicative of an access restriction to the document, the document properties being indicative of a first management group having ownership of the document, the document properties being further indicative of an access restriction to the document for another management group on the basis of the hierarchy of the enterprise organisation being dependant on a relationship link type associating such management group to the first management group, wherein the document properties comprise a respective access restriction associated with each of the at least two relationship link types included in the predefined set; and wherein the document properties are reviewed and access rights including a level of access is associated to the respective document, the access rights stored with the document properties further granting access to a second management group in accordance with the hierarchy of the enterprise organisation and relationship link type associating the second management group through to the first management group;

wherein access to a document is granted to an employee belonging to the second management group when at least the second management group satisfies respective access rights associated with the document.

15. The non-transitory computer readable medium of claim 14 wherein:

the management group type is selected from the set "senior management", "line of business", "key results area", and "other stakeholder"; and the management subgroup is selected from the set "group head", "administrative assistant", "direct report", "project leader", "project team member", "project sponsor", and "project manager".

16. The non-transitory computer readable medium of claim 14 further comprising:

a data record indicative of an employee;

wherein the employee record identifies an associated management group and management subgroup.

17. The non-transitory computer readable medium of claim 14 wherein:

each relationship record has a type selected from the predefined set including at least two relationship link types selected from any two or more of: "reports to", "services", and "other".

18. The non-transitory computer readable medium of claim 14 wherein:

each document record grants access rights for a management group to the respective document, the rights selected from the set "read-only", "read-write", "distribute", "print", "create", and "destroy".

19. The non-transitory computer readable medium of claim 14 wherein:

access rights to a document for a management group and management subgroup are defined such that access to the document by a employee is granted only if the employee is a member of the management group and management subgroup.

20. The non-transitory computer readable medium of claim 14 wherein:

the management group records are used as a network directory using a protocol selected from the set of LDAP, Active Directory, Domino Directory, and X.500.

* * * * *